(12) United States Patent
Casati et al.

(10) Patent No.: US 8,631,391 B2
(45) Date of Patent: Jan. 14, 2014

(54) METHOD AND A SYSTEM FOR PROCESS DISCOVERY

(75) Inventors: Fabio Casati, Palo Alto, CA (US); Mehmet Sayal, Sunnyvale, CA (US); Maria Guadalupe Castellanos, Sunnyvale, CA (US); Yifan Li, Urbana, IL (US); Ming-Chien Shan, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2885 days.

(21) Appl. No.: 11/041,653

(22) Filed: Jan. 24, 2005

(65) Prior Publication Data

US 2006/0167923 A1   Jul. 27, 2006

(51) Int. Cl.
 *G06F 9/44* (2006.01)

(52) U.S. Cl.
 USPC .......................................................... 717/128

(58) Field of Classification Search
 USPC .......................................... 717/126–128, 131
 See application file for complete search history.

(56) References Cited

U.S. PATENT DOCUMENTS

| | | | |
|---|---|---|---|
| 5,276,870 A | 1/1994 | Shan et al. | |
| 5,325,525 A | 6/1994 | Shan et al. | |
| 5,412,806 A | 5/1995 | Du et al. | |
| 5,546,571 A | 8/1996 | Shan et al. | |
| 5,694,591 A | 12/1997 | Du et al. | |
| 5,826,239 A | 10/1998 | Du et al. | |
| 5,870,545 A | 2/1999 | Davis et al. | |
| 5,937,388 A | 8/1999 | Davis et al. | |
| 6,041,306 A | 3/2000 | Du et al. | |
| 6,078,982 A | 6/2000 | Du et al. | |
| 6,278,977 B1 * | 8/2001 | Agrawal et al. | 705/7 |
| 6,308,163 B1 | 10/2001 | Du et al. | |
| 6,728,932 B1 | 4/2004 | Chundi et al. | |
| 6,938,240 B2 * | 8/2005 | Charisius et al. | 717/104 |
| 7,236,940 B2 * | 6/2007 | Chappel | 705/10 |
| 2002/0138316 A1 | 9/2002 | Katz et al. | |
| 2002/0161823 A1 | 10/2002 | Casati et al. | |
| 2002/0170035 A1 | 11/2002 | Casati et al. | |
| 2002/0174093 A1 | 11/2002 | Casati et al. | |
| 2002/0194257 A1 | 12/2002 | Casati et al. | |
| 2003/0018694 A1 | 1/2003 | Chen et al. | |
| 2003/0023450 A1 | 1/2003 | Casati et al. | |
| 2003/0028389 A1 | 2/2003 | Casati et al. | |
| 2003/0083910 A1 | 5/2003 | Sayal et al. | |
| 2003/0084142 A1 | 5/2003 | Casati et al. | |
| 2003/0101089 A1 * | 5/2003 | Chappel et al. | 705/10 |
| 2003/0120530 A1 | 6/2003 | Casati et al. | |
| 2003/0144860 A1 | 7/2003 | Casati et al. | |
| 2003/0149604 A1 | 8/2003 | Casati et al. | |
| 2003/0149714 A1 | 8/2003 | Casati et al. | |
| 2003/0153994 A1 | 8/2003 | Jin et al. | |
| 2003/0154154 A1 | 8/2003 | Sayal et al. | |
| 2003/0191679 A1 | 10/2003 | Casati et al. | |
| 2003/0212569 A1 | 11/2003 | Casati et al. | |
| 2003/0225604 A1 | 12/2003 | Casati et al. | |
| 2003/0225644 A1 | 12/2003 | Casati et al. | |
| 2003/0233273 A1 | 12/2003 | Jin et al. | |
| 2003/0233341 A1 * | 12/2003 | Taylor et al. | 707/1 |
| 2003/0236659 A1 | 12/2003 | Castellanos | |

(Continued)

*Primary Examiner* — Anna Deng

(57) ABSTRACT

The disclosed embodiments relate to a system and a method for process discovery. Embodiments of the present invention comprise extracting process data from a data source, creating a trace using the extracted process data, wherein the trace comprises a plurality of events, and detecting a process model using the plurality of events.

20 Claims, 3 Drawing Sheets

(56) References Cited

U.S. PATENT DOCUMENTS

| | | |
|---|---|---|
| 2003/0236677 A1 | 12/2003 | Casati et al. |
| 2003/0236689 A1 | 12/2003 | Casati et al. |
| 2003/0236691 A1 | 12/2003 | Casati et al. |
| 2004/0015378 A1 | 1/2004 | Casati et al. |
| 2004/0044636 A1 | 3/2004 | Casati et al. |
| 2004/0103076 A1 | 5/2004 | Casati et al. |
| 2004/0103186 A1 | 5/2004 | Casati et al. |
| 2004/0153329 A1 | 8/2004 | Casati et al. |
| 2004/0199517 A1 | 10/2004 | Casati et al. |
| 2004/0205187 A1 | 10/2004 | Sayal et al. |
| 2005/0256818 A1 * | 11/2005 | Sun et al. .................. 706/46 |

* cited by examiner

METHOD AND A SYSTEM FOR PROCESS DISCOVERY

BACKGROUND

This section is intended to introduce the reader to various aspects of art, which could be related to various aspects of the present invention that are described and/or claimed below. This discussion is believed to be helpful in providing the reader with background information to facilitate a better understanding of the various aspects of the present invention. Accordingly, it should be understood that these statements are to be read in this light and not as admissions of prior art.

Business processes within or across an enterprise are often partially or totally automated. This automation can be provided by many different systems from legacy applications, such as an Enterprise Resource Planning ("ERP") system to more modern applications, such as java, web, or workflow applications. Such systems and applications can be heterogeneous, distributed, and independently managed by different entities across the enterprise.

This decentralization and distribution often makes it difficult to get a coherent picture of what processes are actually being performed across the enterprise. For many reasons, however, getting an understanding of what processes are actually performed across the enterprise is advantageous. First, it allows the enterprise to understand its own business operations, which can be helpful to improve those business operations. Second, understanding the processes simplifies the deployment of process monitoring tools. Third, having a process model simplifies fully automating business processes. Conventional process discovery systems are either very simplistic (e.g., they consider only simple cases such as sequential processes or loop-free processes) or limited to considering tasks that are instantaneous.

BRIEF DESCRIPTION OF THE DRAWINGS

Advantages of one or more disclosed embodiments will become apparent upon reading the following detailed description and upon reference to the drawings in which.

DETAILED DESCRIPTION

One or more specific embodiments of the present technique will be described below. In an effort to provide a concise description of these embodiments, not all features of an actual implementation are described in the specification. It should be appreciated that in the development of any such actual implementation, as in any engineering or design project, numerous implementation specific goals, such as compliance with system-related and business-related constraints, can vary from one implementation to another. Moreover, it should be appreciated that such a development effort might be complex and time consuming but would nevertheless be a routine understanding of design, fabrication, and manufacture for those of ordinary skill having the benefit of this disclosure.

Figure 1:
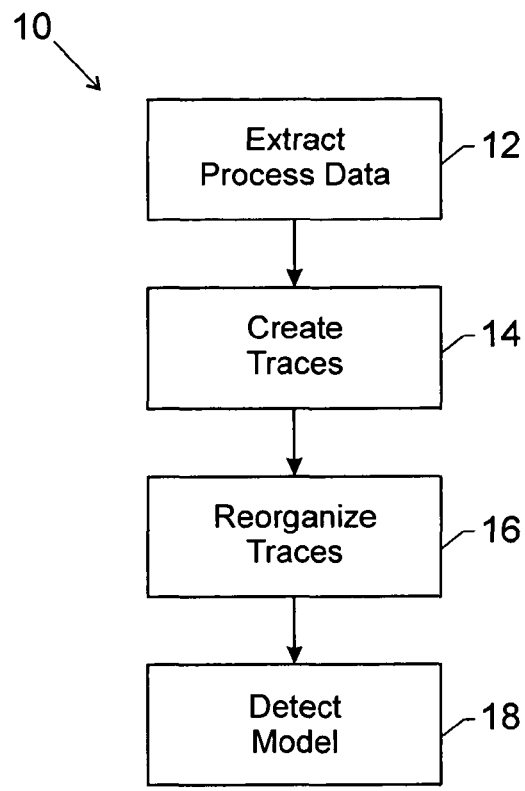
FIG. 1 is a block diagram illustrating one embodiment of an exemplary method for process discovery.

The term process discovery refers to the extraction of a business process model from events, messages, or other data collected by computer systems. Embodiments of the present invention enable process discovery by extracting a process model from a log file or database comprising events corresponding to the execution of operations by one or more applications. This technique is able to discover complex process models, not just simple models that are sequential or loop-free. In addition, the present technique can be used with operations that are not instantaneous and thus can be characterized by both a start time and stop time. In one embodiment, the present technique is employed by a system that monitors business process and links business processes to Information Technology ("IT") resource FIG. 1 is a block diagram illustrating one embodiment of an exemplary method 10 for process discovery. As indicated in block 12, the first step in process discovery is extracting process data. In one embodiment of the invention, process data is extracted by reading business process data from a database or log file stored in a storage medium. In one embodiment, the log file or database comprises a series of time stamps that correspond to the times at which a plurality of business process steps were either started or stopped. In addition, in one embodiment of the invention, the database or log file also stores information about the context in which a particular business process step was performed. For example, an entry in the log file can contain information that says that an "approval" step was started at 3:30 pm and completed at 4:15 pm, and that it was executed in the context of business process number 539. In another embodiment, an entry in the log file can contain a start time and a completion time for one step in an order fulfillment system. Transaction monitoring systems that can provide this kind of log file currently exist and are well known to those skilled in the art.

In one embodiment of the invention, reading the process data comprises reading business process data from a data warehouse or database. In this embodiment, the data warehouse receives log files or database files from a plurality of systems distributed across an enterprise or network. These systems include, but are not limited to, web servers, application servers, ERP systems, message brokers, or other business process management and monitoring systems.

As described above, an entry in the log file contains information regarding the start time, stop time, and context of the steps in a business process. For example, the log file can include the start times and end times for a set of business tasks represented by $T_1, T_2, \ldots, T_n$. Specifically, for a particular task, $T_i$, the log file can include a start time, $T_i^s$, and an stop time, $T_i^e$. The start and stop times for each of the tasks are referred to as an event. In one embodiment, $T_1, T_2, \ldots, T_n$ comprises customer orders and $T_i^s$ and $T_i^e$ comprises the start and completion times for a particular parts of a customer order.

Once the business process data has been read from the log file or database, the process 10 continues by creating a trace, as indicated in block 14. The trace comprises a collection of events corresponding to the execution of a business process. In one embodiment, the events in the trace are partially ordered by time. For example, the sequence $T_3^s T_2^s T_2^e T_3^e T_1^s T_1^e$ is a trace, where $T_3^s \leq T_2^s \leq T_2^e \leq T_3^e \leq T_1^s \leq T_1^e$. The postfix $s$ and $e$ in this example denote the start and completion of a task $T_x$. In one embodiment, the trace is created using computer software, such as a set of Structured Query Language ("SQL") scripts. In one embodiment, the trace comprises a sequence of events that a customer order goes through during an order fulfillment process.

After the traces have been created, it is advantageous to reorganize the traces, as indicated by block 16. Reorganizing the traces is advantageous because it is not uncommon for the end of one event and the start of another to occur simultaneously. This typically occurs when the scheduling is so fast that the granularity of the log file does not distinguish between the end of one event and the start of the next event, or when the transaction monitoring system, if one is present, logs the same timestamp for both events. For this reason, the trace can be reorganized so that stop events are placed before start events if the time stamps for both events are the same. For example, if time stamp $(T_1^e)$=time stamp $(T_2^s)$, then a subset of a trace of the form $T_2^s T_1^e$ would be rearranged to $T_1^e T_2^s$. This is important as it helps organizing the events in the trace in a way that corresponds to the actual execution.

Once the traces have been reorganized as described above, model detection begins, as indicated in block 18. The model detection process will be described in greater detail below with regard to FIG. 2. Before examining the model detection process, however, it will be helpful to present some basic process models exemplary of process structures that can be discovered using embodiments of the present invention. Process structures correspond to ordering constraints among tasks that appear frequently in many process models. Therefore, by discovering process structures from traces, it is then possible to combine them and obtain the complete process model discovered from the traces. Those skilled in the art will appreciate the process structures described below are merely exemplary process structures and are not intended to be exclusive. In alternate embodiments of the invention, other process structures can be discovered.

One example of a process structure is a sequence. In a sequence, a task Y is enabled in the process structure after the completion of another task X. In such case, there exists a directed link from X to Y, which is denoted by Seq(X, Y).

Another example of a process structure is a split. In a split, a single process splits into multiple branches. For example, suppose that task X splits into tasks $Y_1, Y_2, \ldots, Y_n$. That is, there exists n directed links from X to $Y_1, Y_2, \ldots, Y_n$, respectively. There are three main types of splits: (1) an XOR-Split wherein exactly one of the branches is chosen to execute. The XOR-Split is denoted by XOR-Split(X; $Y_1, Y_2, \ldots, Y_n$); (2) an AND-Split, in which all of the branches are executed in parallel. (i.e., all the tasks are conducted simultaneously). The AND-Split is denoted by AND-Split(X; $Y_1, Y_2, \ldots, Y_n$); and (3) an OR-Split, which encompasses the remaining split process types that do not belong to the XOR-Split or the AND-Split. The OR-Split is denoted by OR-Split(X; $Y_1, Y_2, \ldots, Y_n$).

Yet another example of a process structure is a join. In a join, multiple process branches merge into a single process branch. For example, the tasks $X_1, X_2, \ldots, X_n$ could join into task Y. Similar to the split, there are three types of joins: (1) an XOR-Join, wherein exactly one of the branches merges with another branch. The XOR-Join is denoted by XOR-Join($X_1, X_2, \ldots, X_n$; Y); (2) an AND-Join wherein every one of the branches needs to be executed before the merging into a single merged flow. The AND-Join is denoted by AND-Join ($X_1, X_2, \ldots, X_n$; Y); and (3) an OR-Join, which encompasses join structures not belonging to XOR-Join or AND-Join. The OR-Join is denoted by OR-Join($X_1, X_2, \ldots, X_n$; Y).

Figure 2:
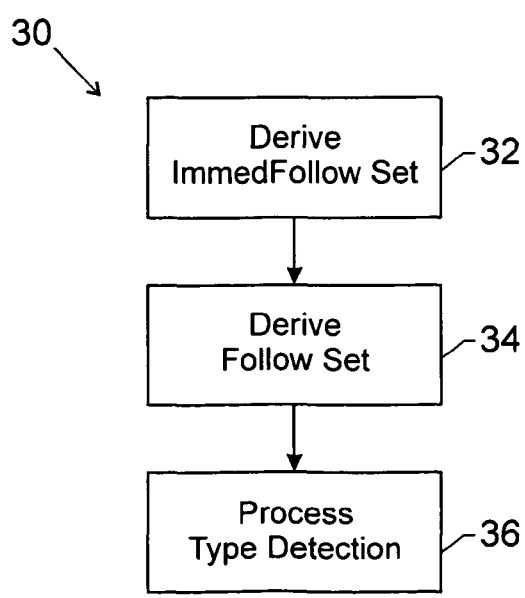
FIG. 2 is a block diagram illustrating one embodiment of an exemplary method for model detection.

FIG. 2 is a block diagram illustrating one embodiment of an exemplary process 30 for model detection. The process 30 is employed to discover one or more of the process structures described above. Model detection is based on the observation that if there is a directed link from task X to task Y, then the random variable that is equal to the difference $X^s - Y^e$ computed across the traces has small expected value and small variance even though there can be multiple occurrences of X and Y in the same trace. The difference $X^s - Y^e$ is typically considered between the two closest pairs (i.e., $X^e$ is matched with the closest earlier appearance of $Y^s$).

As indicated in block 32, the first step in model detection is to derive the ImmedFollow Set. Given tasks X and Y, X will be in the set ImmedFollow(Y) if (1) the sequence of events $Y^e X^s$ is contained in the trace (note that there is no event between Y and X), and (2) $X^s - Y^e$ is relatively small. The ImmedFollow set aims at identifying the possible causal relations between the tasks.

Generally, if X∈ImmedFollow(Y), there are a Sequence, XOR-split or XOR-join. If on the other hand, X∉ImmedFollow(Y), the link between X and Y can still be of the AND/OR-Split or AND/OR-Join type. This is the case because the order of subsequent events cannot be determined from the ImmedFollow set alone. For example, given AND-Split(A; B, C), each time A is completed, B always starts before C. Namely, $A^e C^s$ never occurs, therefore C∉ImmedFollow(A) and yet A can still split into B and C. To handle such cases, the Follow set is derived, as indicated by block 34. Given task X and Y, X will be in the set Follow(Y) if (1) sequence $Y^e * X^s$ appears in at least one trace, wherein the asterisk denotes that there could be zero or more start events between Y and X, and (2) $X^s - Y^e$ is relatively small. From this, the reader will appreciate that for any task X, ImmedFollow(X) ⊂ Follow(X).

After the Follow Set has been derived, process structure detection proceeds, as indicated in block 36. The process structures are detected by employing the following heuristic rules. First, the process structure Seq(X, Y) is discoverable if (1) |ImmedFollow(X)|=1 and (2) Pr($X^e Y^s | X^e$) is high. In one embodiment, a high probability is defined to be greater than about 0.9. The first condition reflects that Seq(X,Y) is discoverable if there is only one event in the set ImmedFollow(X). The second condition reflects that the probability of the event $Y^s$ occurring after $X^e$ is high. The second condition results because if it is always the case that whenever task X finishes, it is immediately followed by the start of task Y, then it is plausible that X causes Y (i.e., there is a directed link from X to Y). In one embodiment, the Seq(X,Y) is discovered if (1) |ImmedFollow(X)|=1 and (2) Pr($X^e Y^s | X^e$)>0.9.

Second, the process structure XOR-Split(X; $Y_1, Y_2, \ldots, Y_n$) is discovered if (1) one of $Y_1, Y_2, \ldots, Y_n$ is in the set ImmedFollow(X) and (2) ∀i, j ∈[1, n], Pr(co-occurrence($X^e, Y_i^s, Y_j^s$)|$X^e$) is low. In one embodiment, a low probability is defined to be less than about 0.05. The second condition states that for every i and j ranging from 1 to n, the probability of $X^e$, $Y_i^s$, $Y_j^s$ occurring together in the same trace is low. This condition is needed to ensure that XOR-Split will only be discovered where only one of the branches $Y_1, Y_2, \ldots, Y_n$ can be chosen. In one embodiment, XOR-Split (X; $Y_1, Y_2, \ldots, Y_n$) is discovered if (1) one of $Y_1, Y_2, \ldots, Y_n$ is in the set ImmedFollow(X) and (2) ∀i, j ∈[1, n], Pr(co-occurrence($X^e, Y_i^s, Y_j^s$)|$X^e$)<0.05.

Third, the process structure AND-Split(X; $Y_1, Y_2, \ldots, Y_n$) is discovered if (1) $Y_1, Y_2, \ldots, Y_n$∈Follow(X) and (2) Pr(co-occurrence($X^e, Y_1^s, Y_2^s, \ldots, Y_n^s$)|$X^e$) is high. The second condition states that for every i and j ranging from 1 to n, the probability of $X^e, Y_i^s, Y_j^s$ occurring together in the same trace is high. This condition is needed to ensure that AND-Split will only be discovered if where all of the branches $Y_1, Y_2, \ldots, Y_n$ are executed once X finishes. In one embodiment, the process structure AND-Split(X; $Y_1, Y_2, \ldots, Y_n$) is discovered if (1) $Y_1, Y_2, \ldots, Y_n$∈Follow(X) and (2) Pr(co-occurrence($X_e, Y_1^s, Y_2^s, \ldots, Y_n^s$)|$X^e$)>0.95.

Fourth, the process type OR-Split(X; $Y_1, Y_2, \ldots, Y_n$) is discovered if the trace contains a split process structure that is neither XOR-Split nor AND-Split. Lastly, those skilled in the art will appreciate that it is possible to compensate for any noise in a system by adjusting the particular thresholds employed.

Those skilled in the art will recognize that the heuristic rules to identify join process structures are symmetrical to the rules described above for split process structures. For example, AND-Join($X_1, X_2, \ldots, X_n$; Y) is discovered if (1) $Y \in \text{Follow}(X_1, X_2, \ldots, X_n)$ and (2) Pr(co-occurrence($Y^s$, $X_1^e, X_2^e, \ldots, X_n^e$)|$Y^s$) is high. The heuristic rules for the remainder of the join process structures discussed above can be derived from the split process structures in a similar fashion.

Further, as stated above, those skilled in the art will also appreciate that sequence, split, and join are only three possible examples of process structures. In alternate embodiments, additional process structures can be discovered. In those cases, heuristic rules similar to those stated above could be developed to permit the discovery of those additional process structures.

Figure 3:
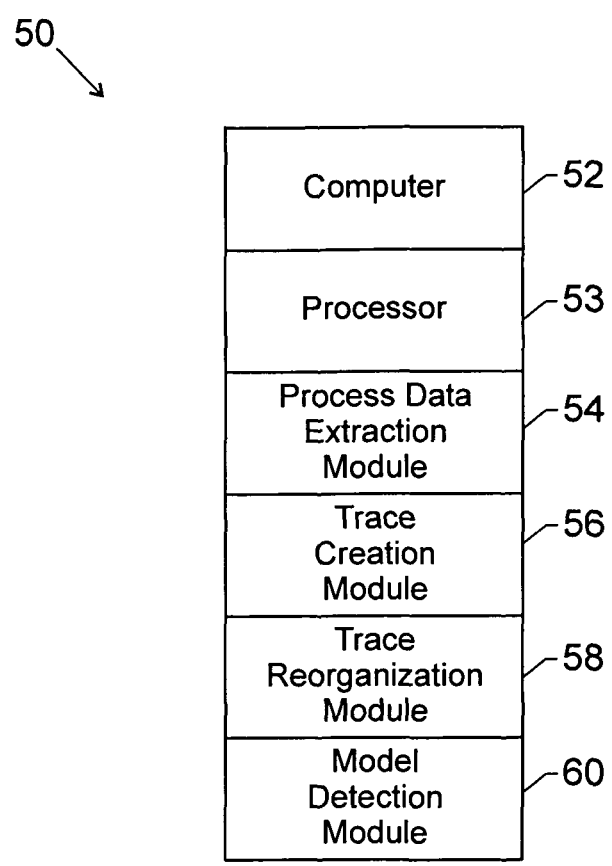
FIG. 3 is a block diagram illustrating one embodiment of a computer system for process discovery.

FIG. 3 is a block diagram illustrating one embodiment of a computer system 50 for process discovery. Specifically, block 52 of FIG. 3 represents a computer. The computer (block 52) comprises or interacts with processor 53 and modules represented by blocks 54, 56, 58, and 60, thus allowing for application of the methods presented in FIGS. 1 and 2. The processor 11 can be any one of a number of suitable processors, including but not limited to a Pentium processor or an Athlon processor. In one embodiment, the processor 11 is located within the computer 52.

The modules (blocks 54, 56, 58, and 60) are hardware, software, or some combination of hardware and software. Additionally, an individual module does not necessarily solely comprise each module function as illustrated. In other words, the modules shown in the blocks 54, 56, 58, and 60 are merely one example and other embodiments can be envisaged wherein the functions are split up differently or wherein some modules are not included or other modules are included. The illustrated modules (blocks 54, 56, 58, and 60) comprise a process data extraction module (block 54) that extracts data from a log file or database, a trace creation module (block 56) that creates a trace based on the extracted data, a trace reorganization module (block 58) that reorganizes the trace, and a model detection module (block 60) that detects the process models within the trace. In this embodiment and in other envisaged computer system embodiments, a user incorporates the functionality of the computer 52 to enhance the performance of the process discovery technique previously discussed. For example, the computer (block 52) can discover process models, as described above, by utilizing the modules represented by blocks 54, 56, 58, and 60.

Figure 4:
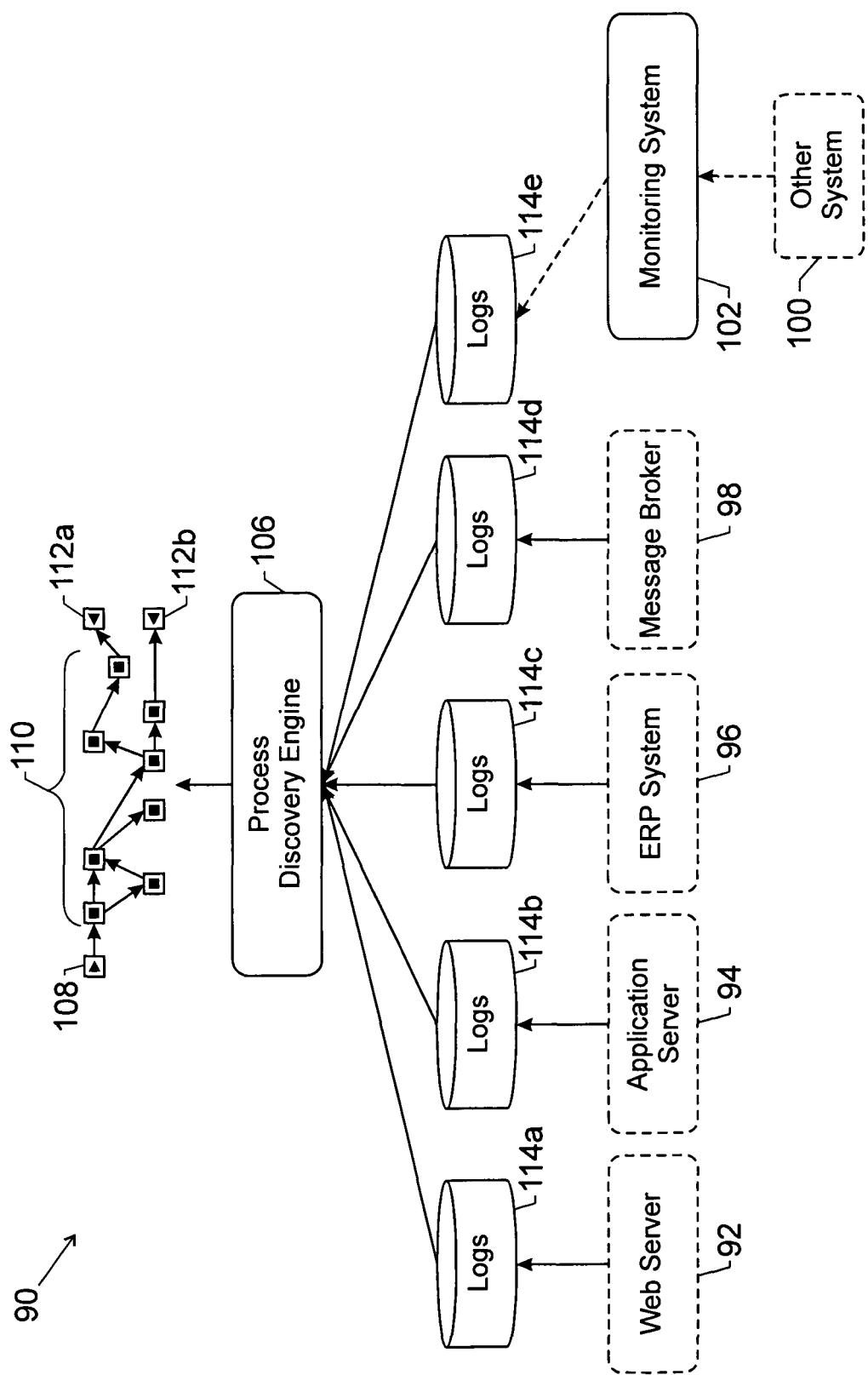
FIG. 4 is a block diagram illustrating one embodiment of a process discovery system.

FIG. 4 is a block diagram illustrating one embodiment of a process discovery system 90. In one embodiment, the process discovery system 90 comprises one or more applications, such as web servers 92, application servers 94, ERP systems 96, message brokers 98, or other systems 100 with monitoring systems 102. As described above, the applications 92, 94, 96, 98, 100, and 102 stored a series of events in log files 104a-104e. In one embodiment, the events stored in the log files 104a-104e are related to one or more business processes.

In one embodiment, a process discovery engine 106, such as the computer system 50 described above, extracts data from the log files 104a-104e, creates one or more traces based on the extracted data, reorganizes the traces, and detects the process models within the traces. For example, FIG. 4 illustrates a process start 108, a plurality of tasks 110, and two process completes 112a and 112b. The arrows between the events 110 illustrate the plurality of traces.

While the invention can be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A computer implemented method comprising:
extracting process data from a data source;
creating a trace using the extracted process data, wherein the trace comprises a plurality of events;
reorganizing the plurality of events within the trace to create a reorganized plurality of events;
deriving a set comprising events that directly follow one another for a task X and a task Y from the reorganized plurality of events;
deriving a set comprising events that indirectly follow one another for the task X and the task Y from the reorganized plurality of events; and
detecting a process model using the set of events that directly follow one another and the set of events that indirectly follow one another;
wherein detecting the process model comprises detecting a process type based on a probabilistic relationship between the task X and the task Y, the probabilistic relationship determined through statistical analysis of the set of events that directly follow one another and the set of events that indirectly follow one another.

2. The method of claim 1, wherein detecting the process type comprises detecting a sequence process type if a number of elements in the set comprising events that directly follow one another is one (1) and a probability of $Y^s$ immediately following $X^e$ is greater than about 0.9.

3. The method of claim 1, wherein detecting the process type comprises detecting an XOR-split process type if one member of the set comprising events that directly follow one another for X comprises at least one of $Y_1, Y_2, \ldots, Y_n$ and wherein for any i, j from 1 to n, a probability of co-occurrence of $X^e, Y_i^s$, and $Y_j^s$ is less than about 0.05.

4. The method of claim 1, wherein detecting the process type comprises detecting an AND-Split process type when $Y_1, Y_1, Y_2, \ldots, Y_n$ are in the set comprising events that indirectly follow one another for X and a probability is greater than about 0.95 that there is a co-occurrence of $X^e, Y_1^s, Y_2^s, \ldots, Y_n^s$.

5. The method of claim 1, wherein detecting the process type comprises detecting an OR-Split process type if $Y_1, Y_2, \ldots, Y_n$ are in the set comprising events that indirectly follow one another for X, wherein X and Y do not comprise a XOR-Split process type or an AND-Split process type.

6. The method of claim 1, wherein detecting the process type comprises detecting an XOR-Join process type if one member of the set comprising events that directly follow one another for Y comprises at least one of $X_1, X_2, \ldots, X_n$ and wherein for any i, j from 1 to n, a probability of co-occurrence of $X^e, Y_i^s$, and $Y_j^s$ is less than about 0.05.

7. The method of claim 1, wherein detecting the process type comprises detecting an AND-Join process type when $X_1, X_2, \ldots, X_n$ are in the set comprising events that indirectly follow one another for Y and a probability is greater than about 0.95 that there is a co-occurrence of $Y^e$, $X_1^s$, $X_2^s$, ... $X_n^s$.

8. The method of claim 1, wherein detecting the process type comprises detecting an OR-Join process type if $X_1$, $X_2$, ..., $X_n$ are in the set comprising events that indirectly follow one another for Y, wherein X and Y do not comprise a XOR-Join process type or an AND-Join process type.

9. The method of claim 1, wherein the extracting process data from a data source comprises extracting process data from a log-file.

10. The method of claim 1, wherein creating the trace comprises creating a trace comprising a plurality of events characterized by a start time and a completion time.

11. The method of claim 1, wherein detecting the process model comprises detecting the process model by discovering process structures in the trace.

12. A computer implemented method comprising:
receiving a transmission comprising process data;
creating a trace that comprises a plurality of events using the process data;
reorganizing the plurality of events within the trace to create a reorganized plurality of events;
deriving a set comprising events that directly follow one another for two tasks X and Y from the reorganized plurality of events;
deriving a set comprising events that indirectly follow one another for the two tasks X and Y from the reorganized plurality of events; and
detecting a process structure using the set comprising events that directly follow one another and the set comprising events that indirectly follow one another;
wherein detecting the process structure comprises detecting a process type based on a probabilistic relationship between the task X and the task Y, the probabilistic relationship determined through statistical analysis of the set of events that directly follow one another and the set of events that indirectly follow one another.

13. The method of claim 12, wherein receiving the transmission comprising process data comprises receiving a transmission from an Enterprise Resource Planning system.

14. The method of claim 12, wherein creating the trace comprises creating a trace comprising a plurality of events characterized by a start time and a completion time.

15. The method of claim 12, wherein receiving a transmission comprising process data comprises receiving a transmission from a data warehouse.

16. A computer system for discovering process types, the computer system comprising a processor to execute instruction modules, the instruction modules comprising:
a process data extraction module that extracts data from a log file or database stored in a storage medium;
a trace creation module that creates a trace based on the extracted data;
a trace reorganization module that reorganizes the trace to produce reorganized trace data; and
a model detection module to:
derive a set comprising events that directly follow one another for two tasks X and Y;
derive a set comprising events that indirectly follow one another for the two tasks X and Y; and
detect a process model using the set of events that directly follow one another and the set of events that indirectly follow one another;
wherein detecting the process model comprises detecting a process type based on a probabilistic relationship between the task X and the task Y, the probabilistic relationship determined through statistical analysis of the set of events that directly follow one another and the set of events that indirectly follow one another.

17. The computer system of claim 16, wherein the model detection module is configured to detect a sequence process type when the number of elements in the set comprising events that directly follow one another is one and a probability of $Y^s$ immediately following $X^e$ is greater than about 0.9.

18. The computer system of claim 16, wherein the model detection module is configured to detect an XOR-split process type when one member of the set comprising events that directly follow one another for X comprises at least one of $Y_1$, $Y_2$, ..., $Y_n$ and wherein for any i, j from 1 to n, a probability of co-occurrence of $X^e$, $Y_i^s$, and $Y_j^s$ is less than about 0.05.

19. The computer system of claim 16, wherein process data extraction module is configured to extract process data from a plurality of data sources and combining the process data from the plurality of data sources into a single log file.

20. A tangible, non-transitory, computer-readable medium that stores instructions that, when executed, effect process discovery, comprising:
instructions adapted to extract data from a log file or database;
instructions adapted to create a trace based on the extracted data;
instructions adapted to reorganize the trace to produce reorganized trace data; and
instructions adapted to derive a set comprising events that directly follow one another;
instructions adapted to derive a set comprising events that indirectly follow one another;
instructions adapted to detect a process model using the set of events that directly follow one another and the set of events that indirectly follow one another
instructions adapted to detect a process model using the set of events that directly follow one another and the set of events that indirectly follow one another;
wherein detecting the process model comprises detecting a process type based on a probabilistic relationship between the task X and the task Y, the probabilistic relationship determined through statistical analysis of the set of events that directly follow one another and the set of events that indirectly follow one another.

* * * * *